US012692833B2

(12) United States Patent
Sala Lluma et al.

(10) Patent No.: US 12,692,833 B2
(45) Date of Patent: Jul. 28, 2026

(54) METHODS FOR OPERATING WIND TURBINES AND CHARGING AUXILIARY POWER SOURCES

(71) Applicant: General Electric Renovables Espana, S.L., Barcelona (ES)

(72) Inventors: Marc Sala Lluma, Barcelona (ES); Benjamin Palethorpe, Nantes (FR); Luca Vita, Barcelona (ES)

(73) Assignee: GE Vernova Renovables Espana, S.L., Barcelona (ES)

( * ) Notice: Subject to any disclaimer, the term of this patent is extended or adjusted under 35 U.S.C. 154(b) by 787 days.

(21) Appl. No.: 18/079,357

(22) Filed: Dec. 12, 2022

(65) Prior Publication Data

US 2023/0184215 A1    Jun. 15, 2023

(30) Foreign Application Priority Data

Dec. 14, 2021    (EP) ..................................... 21383137

(51) Int. Cl.
| | |
|---|---|
| *F03D 7/02* | (2006.01) |
| *F03D 9/25* | (2016.01) |
| *H02J 3/38* | (2006.01) |
| *H02J 7/34* | (2006.01) |
| *H02J 3/388* | (2026.01) |
| *H02J 101/28* | (2026.01) |

(52) U.S. Cl.
CPC .............. *F03D 7/0224* (2013.01); *F03D 9/25* (2016.05); *H02J 3/381* (2013.01); *H02J 7/34* (2013.01); *H02J 3/388* (2020.01); *H02J 2101/28* (2026.01)

(58) Field of Classification Search
CPC .......... F03D 7/0224; F03D 9/25; H02J 3/381; H02J 7/34; H02J 2300/28; H02J 3/388
See application file for complete search history.

(56) References Cited

U.S. PATENT DOCUMENTS

| | | |
|---|---|---|
| 8,680,700 B2 | 3/2014 | Gomez De Las Heras Carbonell et al. |
| 10,662,924 B2 | 5/2020 | Caponetti et al. |

(Continued)

FOREIGN PATENT DOCUMENTS

| | | |
|---|---|---|
| EP | 1696122 A2 | 8/2006 |
| EP | 2447530 B1 | 6/2016 |

(Continued)

OTHER PUBLICATIONS

European Search Report Corresponding to EP21383137 on May 18, 2022.

*Primary Examiner* — Viet P Nguyen
(74) *Attorney, Agent, or Firm* — Dority & Manning, P.A.

(57) ABSTRACT

The present disclosure relates to methods for operating wind turbines (10) and charging one or more auxiliary power sources (84) for providing auxiliary power to one or more wind turbines (10). A method comprises pitching the wind turbine blades (22) to a predetermined idling pitch angle such that the wind turbine generator (42) produces power for charging one or more auxiliary power sources (84) above a predetermined wind speed. The method further comprises keeping the pitch angle (25) of the blades (22) at the idling pitch angle and charging the auxiliary power sources (84) when a prevailing wind speed reaches or exceeds the predetermined wind speed.

15 Claims, 4 Drawing Sheets

100

(56)                 References Cited

U.S. PATENT DOCUMENTS

| | | | |
|---|---|---|---|
| 2020/0166017 A1 | 5/2020 | Hansen et al. | |
| 2022/0372952 A1 * | 11/2022 | Nielsen | F03D 13/20 |

FOREIGN PATENT DOCUMENTS

| | | | |
|---|---|---|---|
| EP | 3071831 B1 | 8/2018 | |
| WO | WO-2021063650 A1 * | 4/2021 | F03D 13/20 |

* cited by examiner

100

DETERMINING IF A PREDETERMINED OPERATIONAL CONDITION FOR IDLING OPERATION IS MET — 110

IF MET, PITCHING TO AN IDLING PITCH ANGLE — 120

MAINTAINING THE IDLING PITCH ANGLE — 130

CHARGING AUXILIARY POWER SOURCES — 140

METHODS FOR OPERATING WIND TURBINES AND CHARGING AUXILIARY POWER SOURCES

The present disclosure relates to methods for operating wind turbines, in particular to methods which include charging auxiliary power sources for providing auxiliary power to one or more wind turbines. The present disclosure further relates to wind turbines.

BACKGROUND

Modern wind turbines are commonly used to supply electricity into the electrical grid. Wind turbines of this kind generally comprise a tower and a rotor arranged on the tower. The rotor, which typically comprises a hub and a plurality of blades, is set into rotation under the influence of the wind on the blades. Said rotation generates a torque that is normally transmitted through a rotor shaft to a generator, either directly ("directly driven" or "gearless") or through the use of a gearbox. This way, the generator produces electricity which can be supplied to the electrical grid.

The wind turbine hub may be rotatably coupled to a front of the nacelle. The wind turbine hub may be connected to a rotor shaft, and the rotor shaft may then be rotatably mounted in the nacelle using one or more rotor shaft bearings arranged in a frame inside the nacelle. The nacelle is a housing arranged on top of a wind turbine tower that may contain and protect the gearbox (if present) and the generator (if not placed outside the nacelle) and, depending on the wind turbine, further components such as a power converter, and auxiliary systems.

A wind turbine generally comprises electrical systems such as pitch control systems, ventilation and temperature regulation systems, communication systems, oil pump systems and others which require electrical power for operating. The power for operating these systems may be obtained from the electrical grid or from the wind turbine generator.

If a grid loss occurs, i.e. if the wind turbine is for any reason prevented from obtaining power from the electrical grid and supplying power to the grid, some of the electrical systems of the wind turbine may stop working. For extending the operation of at least some electrical systems of the wind turbine when the grid is unavailable, one or more energy storage and/or energy supply devices may be provided. For example, a battery-based system, supercapacitors such as uninterruptible power supplies (UPSs), or one or more diesel generators may be provided.

If one or more wind turbines of a wind farm become disconnected from the electrical grid, the disconnected wind turbines may be configured to enter a so-called island mode. While a wind turbine is in island mode, some relevant wind turbine electrical systems, e.g. communication systems and ventilation systems, may keep operating until electrical power provided by auxiliary power sources runs out as well.

While disconnected from the grid, and in order to protect the wind turbines from excessive loads, the wind turbines are generally idled. I.e., the wind turbine blades may be positioned e.g. at a feathered position of about 90° with respect to the rotor plane for slowly rotating e.g. at 1 RPM. A wind turbine may be in such an island mode until grid connection is regained, provided that an amount of auxiliary power available is actually sufficient for restarting.

In order to keep critical auxiliary systems operative for longer periods of time, a large number of power supply/ storage devices and/or relatively large energy supply/storage devices may be required. It is known for example to provide diesel generators or solar panels to provide power for a prolonged period of time. In addition, if the size and/or number of auxiliary power sources is still not sufficient, for example for supplying electrical power during several days or weeks, going to the wind turbine site and recharging/ refueling e.g. diesel generators may be necessary. This may particularly be time consuming and costly for offshore wind turbines.

There may be other scenarios where a wind turbine may be prevented from obtaining power from the electrical grid and/or where the auxiliary power sources of a wind turbine may be at least partially depleted and it may be beneficial to charge them. For example, if too much power is being supplied to the electrical grid, some wind turbines may be required to reduce or to stop supplying energy to the grid. Instead of shutting down the wind turbines, they may be put in an idling condition. Depending on the availability of the electrical grid to get power from it for operating relevant electrical systems of the wind turbine, the use of energy storage devices may be necessary.

The present disclosure aims to provide improvements in having a sufficient supply of auxiliary power available when needed and for longer periods of time.

SUMMARY

In an aspect of the present disclosure, a method for operating a wind turbine is provided. The wind turbine comprises a wind turbine rotor including a plurality of blades and a wind turbine generator. The wind turbine is configured to supply electrical power from the generator to one or more auxiliary power sources in an autonomous mode. The method comprises determining whether a predetermined condition for idling operation of the wind turbine is met. If the predetermined condition for idling operation is met, the method further comprises pitching the blades to an idling pitch angle such that the wind turbine generator produces power for charging the auxiliary power sources during idling above a predetermined wind speed. The method further comprises maintaining the pitch angle of the blades at the idling pitch angle during idling and charging the auxiliary power sources when a prevailing wind speed reaches or exceeds the predetermined wind speed.

According to this aspect, if a certain condition for idling operation is met, the wind turbine is pitched to a predetermined idling pitch angle and this pitch angle is maintained regardless of a prevailing wind speed. When a prevailing wind speed is at or above a predetermined wind speed, the auxiliary power sources for providing auxiliary power to one or more wind turbines may be charged as the speed of rotation of the rotor in idling may be sufficiently high to start the charging. However, when a prevailing wind speed is below the predetermined wind speed, the speed of rotation may not be sufficient for allowing charging and therefore the auxiliary power sources may not be charged. A fixed pitch idling operation is thus provided which minimizes the use of power for maintaining the idling operation, and at the same time is able to charge auxiliary power sources and keep loads on the wind turbine at acceptable levels.

In this way, although may be not immediately, the auxiliary power sources may end up being charged and the relevant electric systems in the wind turbine may be kept operative for a longer period of time. Also, the wind turbine is in a better position to be able to restart when conditions in the grid and of the wind allow for this. Less auxiliary power sources may be required in a wind turbine or wind farm, and/or a size of the auxiliary power sources may be reduced.

Throughout this disclosure, a condition for idling operation may be understood as a condition that a wind turbine may detect, e.g. by measuring one or more parameters such as wind speed, rotational speed of the rotor, availability of the electrical grid to obtain energy from it, loads, vibrations and more, and which serves as a trigger for pitching the wind turbine blades to a predetermined idling pitch angle. In some examples, a condition for idling operation may be related to an excessive risk of damage to the wind turbine. For instance, if such a condition for idling operation, which may be referred to as danger condition, is detected, the wind turbine is configured to pitch its blades to avoid, or at least reduce the risk, of being damaged. In other examples, other situations which trigger the pitching of the blades to a predetermined idling pitch angle may be detected.

Throughout this disclosure, auxiliary power sources may refer to systems or devices configured at least in part to store electrical energy which can be supplied to certain components of the wind turbine for powering them, for example if the electrical grid is not available. At least one or more of batteries and supercapacitors such as uninterruptible power supplies (UPSs) may be used. Terms such as auxiliary power sources, stored energy sources and energy storage devices/systems may be used interchangeably herein.

Throughout this disclosure, a pitch angle of a wind turbine blade may be understood as an angle that may be measured, in cross-section, between a reference line and a chord of the blade. The reference line may be substantially parallel, e.g. included, in a wind turbine rotor plane in some examples. Herein, an idling pitch angle may be understood as a pitch angle selected for idling operation. In accordance with examples, the idling pitch angle is not 90° or a "feather" position of the blades, but rather when the wind turbine blades are positioned at this angle, the wind turbine generator begins to be able to supply power to auxiliary power sources when reaching, e.g. overcoming, a predetermined wind speed, and the wind turbine is not able to generate power below the predetermined wind speed. The idling pitch angle may be selected such that this ability to produce/not to produce power occurs at a particular wind speed. The idling pitch angle may also be selected such that the wind turbine is not damaged at high wind speeds. High wind speeds may refer to wind speeds above a cut-out wind speed, e.g. above 25 m/s, and may particularly refer to wind speeds significantly higher than the cut-out wind speed, e.g. 50 m/s or more, 60 m/s or more, or 70 m/s or more throughout this disclosure.

A predetermined wind speed may herein therefore refer to a threshold wind speed above which the wind turbine, having its blades at the idling pitch angle, is able to supply power to auxiliary power sources, and below which the wind turbine is not able to do so. A suitable idling pitch angle for maximizing a range of wind speeds at which one or more auxiliary power supplies of the wind turbine are charged as well as for avoiding wind turbine damage when a wind speed is excessively high may be chosen. In this way, a good balance between a period of time available for charging one or more stored energy sources of the wind farm or the turbine while minimizing a risk of wind turbine damage when the wind is too strong may be achieved.

Throughout this disclosure, it may be understood that a wind turbine is in operation ("normal operation") when its rotor is rotating at a speed that is high enough to produce power, the electrical grid is available, and the generator of the wind turbine is producing electrical power which is transferred into the electrical grid. The term "normal operation" may be used herein to explicitly refer to such a situation and explicitly differentiate it from operation of a wind turbine in for example an autonomous mode.

Throughout this disclosure, the term "autonomous mode" may refer to a mode of operation of a wind turbine in which the wind turbine is disconnected from the grid and the wind turbine is configured to operate independently from the electrical grid operation. In this mode, electrical power may be obtained from auxiliary power sources for keeping wind turbine critical electric systems, e.g. one or more of communication systems, temperature and ventilation regulation systems, bearing lubrication systems, controller systems and navigation lights operative.

When reference is made throughout this disclosure to the fact that a wind turbine is (electrically) disconnected from the grid, it may be understood that a wind turbine is prevented from supplying as well as obtaining electric power to/from the grid.

Throughout this disclosure, idling operation may refer to a wind turbine which has its rotor rotating relatively slowly but is not providing electric power to the electric grid. A wind turbine may therefore idle in autonomous mode. In some examples, a wind turbine in idling operation may be able to charge auxiliary power systems.

In a further aspect of the present disclosure, a method for operating a wind turbine is provided. The wind turbine comprises a rotor including a plurality of blades and a generator. The wind turbine is configured to supply electrical power from the generator to one or more auxiliary power sources in an autonomous mode of operation. The method comprises, when the generator is in the autonomous mode of operation, pitching the blades to an idling pitch angle and idling the wind turbine rotor with a fixed pitch angle corresponding to the idling pitch angle. And the method further comprises charging the auxiliary power sources when a rotor rotational speed in idling is at or above a rotational speed threshold, and changing the pitch angle of the blades when a predetermined operational condition is met.

In yet a further aspect of the present disclosure, a wind turbine is provided, which includes a control system configured to carry out examples of the herein described methods.

DETAILED DESCRIPTION OF EXAMPLES

Figure 1:
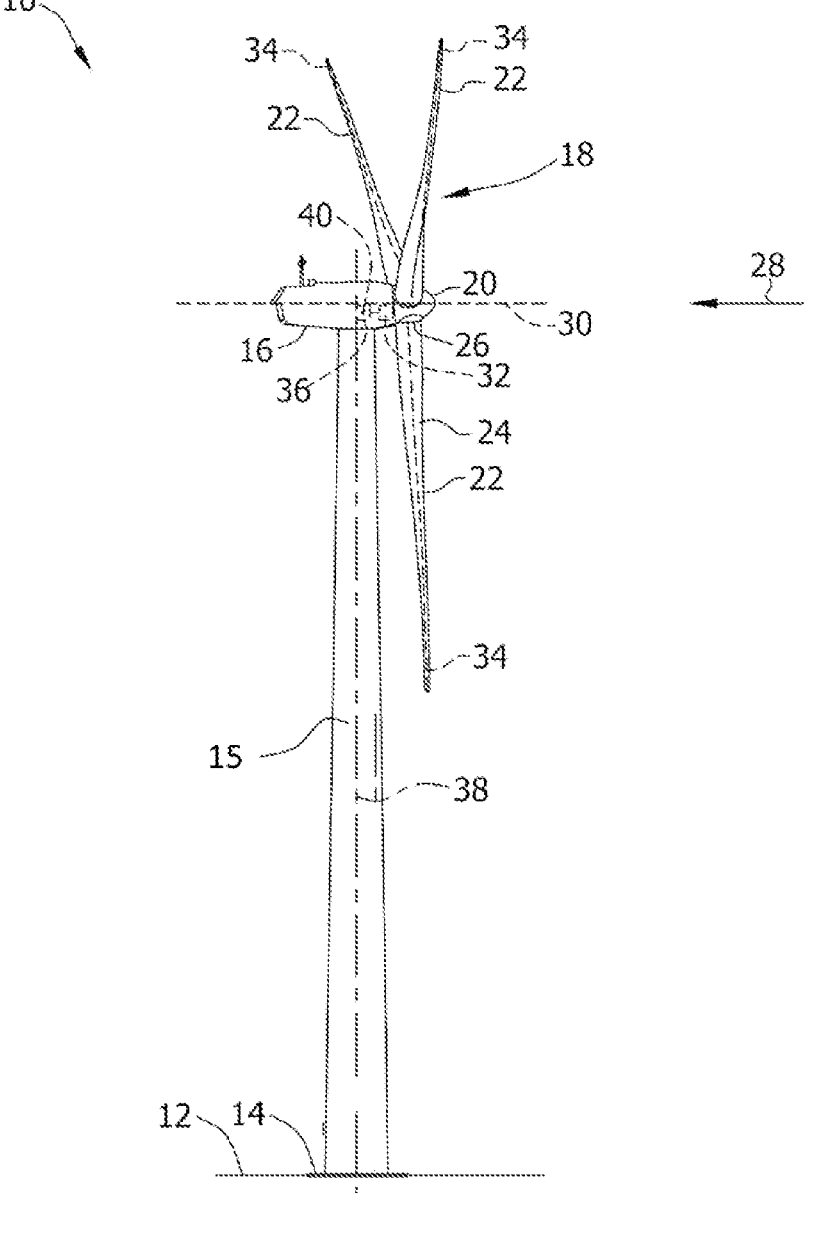
FIG. 1 illustrates a perspective view of one example of a wind turbine.

Reference now will be made in detail to embodiments of the present disclosure, one or more examples of which are illustrated in the drawings. Each example is provided by way of explanation only, not as a limitation. In fact, it will be apparent to those skilled in the art that various modifications and variations can be made in the present disclosure. For instance, features illustrated or described as part of one embodiment can be used with another embodiment to yield a still further embodiment. Thus, it is intended that the present disclosure covers such modifications and variations as come within the scope of the appended claims and their equivalents.

FIG. 1 is a perspective view of an example of a wind turbine 10. In the example, the wind turbine 10 is a horizontal-axis wind turbine. Alternatively, the wind turbine 10 may be a vertical-axis wind turbine. In the example, the wind turbine 10 includes a tower 15 that extends from a support system 14 on a ground 12, a nacelle 16 mounted on tower 15, and a rotor 18 that is coupled to nacelle 16. The rotor 18 includes a rotatable hub 20 and at least one rotor blade 22 coupled to and extending outward from the hub 20. In the example, the rotor 18 has three rotor blades 22. In an alternative embodiment, the rotor 18 includes more or less than three rotor blades 22. The tower 15 may be fabricated from tubular steel to define a cavity (not shown in FIG. 1) between a support system 14 and the nacelle 16. In an alternative embodiment, the tower 15 is any suitable type of a tower having any suitable height. According to an alternative, the tower can be a hybrid tower comprising a portion made of concrete and a tubular steel portion. Also, the tower can be a partial or full lattice tower.

The rotor blades 22 are spaced about the hub 20 to facilitate rotating the rotor 18 to enable kinetic energy to be transferred from the wind into usable mechanical energy, and subsequently, electrical energy. The rotor blades 22 are mated to the hub 20 by coupling a blade root region 24 to the hub 20 at a plurality of load transfer regions 26. The load transfer regions 26 may have a hub load transfer region and a blade load transfer region (both not shown in FIG. 1). Loads induced to the rotor blades 22 are transferred to the hub 20 via the load transfer regions 26.

In examples, the rotor blades 22 may have a length ranging from about 15 meters (m) to about 90 m or more. Rotor blades 22 may have any suitable length that enables the wind turbine 10 to function as described herein. For example, non-limiting examples of blade lengths include 20 m or less, 37 m, 48.7 m, 50.2 m, 52.2 m or a length that is greater than 91 m. As wind strikes the rotor blades 22 from a wind direction 28, the rotor 18 is rotated about a rotor axis 30. As the rotor blades 22 are rotated and subjected to centrifugal forces, the rotor blades 22 are also subjected to various forces and moments. As such, the rotor blades 22 may deflect and/or rotate from a neutral, or non-deflected, position to a deflected position.

Moreover, a pitch angle of the rotor blades 22, e.g. an angle that determines an orientation of the rotor blades 22 with respect to the wind direction, may be changed by a pitch system 32 to control the load and power generated by the wind turbine 10 by adjusting an angular position of at least one rotor blade 22 relative to wind vectors. Pitch axes 34 of rotor blades 22 are shown. During operation of the wind turbine 10, the pitch system 32 may particularly change a pitch angle of the rotor blades 22 such that the angle of attack of (portions of) the rotor blades are reduced, which facilitates reducing a rotational speed and/or facilitates a stall of the rotor 18.

In the example, a blade pitch of each rotor blade 22 is controlled individually by a wind turbine controller 36 or by a pitch control system 80. Alternatively, the blade pitch for all rotor blades 22 may be controlled simultaneously by said control systems.

Further, in the example, as the wind direction 28 changes, a yaw direction of the nacelle 16 may be rotated about a yaw axis 38 to position the rotor blades 22 with respect to wind direction 28.

In the example, the wind turbine controller 36 is shown as being centralized within the nacelle 16, however, the wind turbine controller 36 may be a distributed control system throughout the wind turbine 10, on the support system 14, within a wind farm, and/or at a remote-control center. The wind turbine controller 36 may include one or more processors configured to perform one or more of the steps of the methods described herein. Further, many of the other components described herein include one or more processors. The wind turbine controller 36 may also include a memory, e.g. one or more memory devices. As used herein, a memory may comprise memory element(s) including, but not limited to, a computer readable medium (e.g., random access memory (RAM)), a computer readable non-volatile medium (e.g., a flash memory), a floppy disk, a compact disc-read only memory (CD-ROM), a magneto-optical disk (MOD), a digital versatile disc (DVD) and/or other suitable memory elements.

Figure 2:
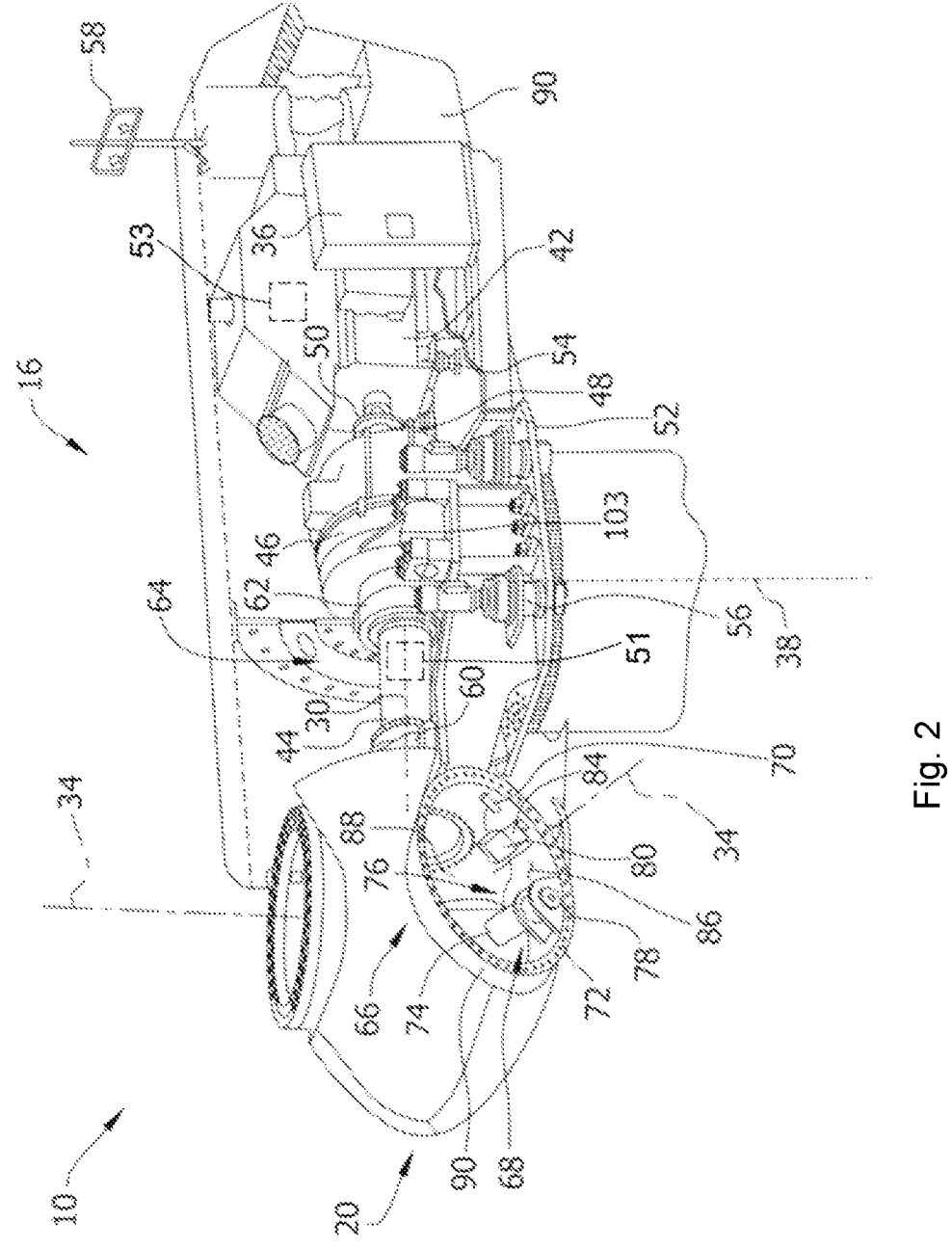
FIG. 2 illustrates a simplified, internal view of one example of the nacelle of the wind turbine of the FIG. 1.

FIG. 2 is an enlarged sectional view of a portion of the wind turbine 10. In the example, the wind turbine 10 includes the nacelle 16 and the rotor 18 that is rotatably coupled to the nacelle 16. More specifically, the hub 20 of the rotor 18 is rotatably coupled to an electric generator 42 positioned within the nacelle 16 by the main shaft 44, a gearbox 46, a high-speed shaft 48, and a coupling 50. In the example, the main shaft 44 is disposed at least partially coaxial to a longitudinal axis (not shown) of the nacelle 16. A rotation of the main shaft 44 drives the gearbox 46 that subsequently drives the high-speed shaft 48 by translating the relatively slow rotational movement of the rotor 18 and of the main shaft 44 into a relatively fast rotational movement of the high-speed shaft 48. The latter is connected to the generator 42 for generating electrical energy with the help of a coupling 50. Furthermore, a transformer 90 and/or suitable electronics, switches, and/or inverters may be arranged in the nacelle 16 in order to transform electrical energy generated by the generator 42 having a voltage between e.g. 400V to 1000 V into electrical energy having medium voltage (e.g. 10-35 KV). Offshore wind turbines may have for example generator voltages between 650 V and 3500 V, and transformer voltages may for instance be between 30 kV and 70 kV. Said electrical energy is conducted via power cables from the nacelle 16 into the tower 15.

In some examples, the wind turbine 10 may include one or more shaft sensors 51. The shaft sensors may be configured to monitor at least one of torque loads acting on the main shaft 44 and/or the high-speed shaft 48, and a rotational speed of the shaft 44, 48. In some examples, the wind turbine 10 may include one or more generator sensors 53. The generator sensors may be configured to monitor at least one of a rotational speed of the generator 42 and a generator torque. Shaft sensors 51 and/or generator sensors 53 may include, for instance, one or more torque sensors (e.g., strain gauges or pressure sensors), optical sensors, accelerometers, magnetic sensors, speed sensors and Micro-Inertial Measurement Units (MIMUs).

The gearbox 46, generator 42 and transformer 90 may be supported by a main support structure frame of the nacelle 16, optionally embodied as a main frame 52. The gearbox 46 may include a gearbox housing that is connected to the main frame 52 by one or more torque arms 103. In the example, the nacelle 16 also includes a main forward support bearing 60 and a main aft support bearing 62. Furthermore, the generator 42 can be mounted to the main frame 52 by decoupling support means 54, in particular in order to prevent vibrations of the generator 42 to be introduced into the main frame 52 and thereby causing a noise emission source.

Optionally, the main frame 52 is configured to carry the entire load caused by the weight of the rotor 18 and components of the nacelle 16 and by the wind and rotational loads, and furthermore, to introduce these loads into the tower 15 of the wind turbine 10. The rotor shaft 44, generator 42, gearbox 46, high speed shaft 48, coupling 50, and any associated fastening, support, and/or securing device including, but not limited to, support 52, and forward support bearing 60 and aft support bearing 62, are sometimes referred to as a drive train 64.

In some examples, the wind turbine may be a direct drive wind turbine without gearbox 46. Generator 42 operates at the same rotational speed as the rotor 18 in direct drive wind turbines. They therefore generally have a much larger diameter than generators used in wind turbines having a gearbox 46 for providing a similar amount of power than a wind turbine with a gearbox.

The nacelle 16 may also include a yaw drive mechanism 56 that may be used to rotate the nacelle 16 and thereby also the rotor 18 about the yaw axis 38 to control the perspective of the rotor blades 22 with respect to the wind direction 28.

For positioning the nacelle 16 appropriately with respect to the wind direction 28, the nacelle 16 may also include at least one meteorological measurement system which may include a wind vane and an anemometer. The meteorological measurement system 58 can provide information to the wind turbine controller 36 that may include wind direction 28 and/or wind speed.

In the example, the pitch system 32 is at least partially arranged as a pitch assembly 66 in the hub 20. The pitch assembly 66 includes one or more pitch drive systems 68 and at least one sensor 70. Each pitch drive system 68 is coupled to a respective rotor blade 22 (shown in FIG. 1) for modulating the pitch angle of a rotor blade 22 along the pitch axis 34. Only one of three pitch drive systems 68 is shown in FIG. 2.

In the example, the pitch assembly 66 includes at least one pitch bearing 72 coupled to hub 20 and to a respective rotor blade 22 (shown in FIG. 1) for rotating the respective rotor blade 22 about the pitch axis 34. The pitch drive system 68 includes a pitch drive motor 74, a pitch drive gearbox 76, and a pitch drive pinion 78. The pitch drive motor 74 is coupled to the pitch drive gearbox 76 such that the pitch drive motor 74 imparts mechanical force to the pitch drive gearbox 76. The pitch drive gearbox 76 is coupled to the pitch drive pinion 78 such that the pitch drive pinion 78 is rotated by the pitch drive gearbox 76. The pitch bearing 72 is coupled to pitch drive pinion 78 such that the rotation of the pitch drive pinion 78 causes a rotation of the pitch bearing 72.

Pitch drive system 68 is coupled to the wind turbine controller 36 for adjusting the pitch angle of a rotor blade 22 upon receipt of one or more signals from the wind turbine controller 36. In the example, the pitch drive motor 74 is any suitable motor driven by electrical power and/or a hydraulic system that enables pitch assembly 66 to function as described herein. Alternatively, the pitch assembly 66 may include any suitable structure, configuration, arrangement, and/or components such as, but not limited to, hydraulic cylinders, springs, and/or servomechanisms. In certain embodiments, the pitch drive motor 74 is driven by energy extracted from a rotational inertia of hub 20 and/or a stored energy source (not shown) that supplies energy to components of the wind turbine 10.

The pitch assembly 66 may also include one or more pitch control systems 80 for controlling the pitch drive system 68 according to control signals from the wind turbine controller 36, in case of specific prioritized situations and/or during rotor 18 overspeed. In the example, the pitch assembly 66 includes at least one pitch control system 80 communicatively coupled to a respective pitch drive system 68 for controlling pitch drive system 68 independently from the wind turbine controller 36. In the example, the pitch control system 80 is coupled to the pitch drive system 68 and to a sensor 70. During normal operation of the wind turbine 10, the wind turbine controller 36 may control the pitch drive system 68 to adjust a pitch angle of rotor blades 22.

According to an embodiment, a power generator 84, for example comprising a battery and electric capacitors, is arranged at or within the hub 20 and is coupled to the sensor 70, the pitch control system 80, and to the pitch drive system 68 to provide a source of power to these components. In the example, the power generator 84 provides a continuing source of power to the pitch assembly 66 during operation of the wind turbine 10. In an alternative embodiment, power source 84 provides power to the pitch assembly 66 only during an electrical power loss event of the wind turbine 10. The electrical power loss event may include power grid loss or dip, malfunctioning of an electrical system of the wind turbine 10, and/or failure of the wind turbine controller 36. During the electrical power loss event, the power generator 84 operates to provide electrical power to the pitch assembly 66 such that pitch assembly 66 can operate during the electrical power loss event.

In the example, the pitch drive system 68, the sensor 70, the pitch control system 80, cables, and the power source 84 are each positioned in a cavity 86 defined by an inner surface 88 of hub 20. In an alternative embodiment, said components are positioned with respect to an outer surface of hub 20 and may be coupled, directly or indirectly, to the outer surface.

As used herein, the term "processor" is not limited to integrated circuits referred to in the art as a computer, but broadly refers to a controller, a microcontroller, a microcomputer, a programmable logic controller (PLC), an application specific integrated circuit, and other programmable circuits, and these terms are used interchangeably herein.

Figure 3:
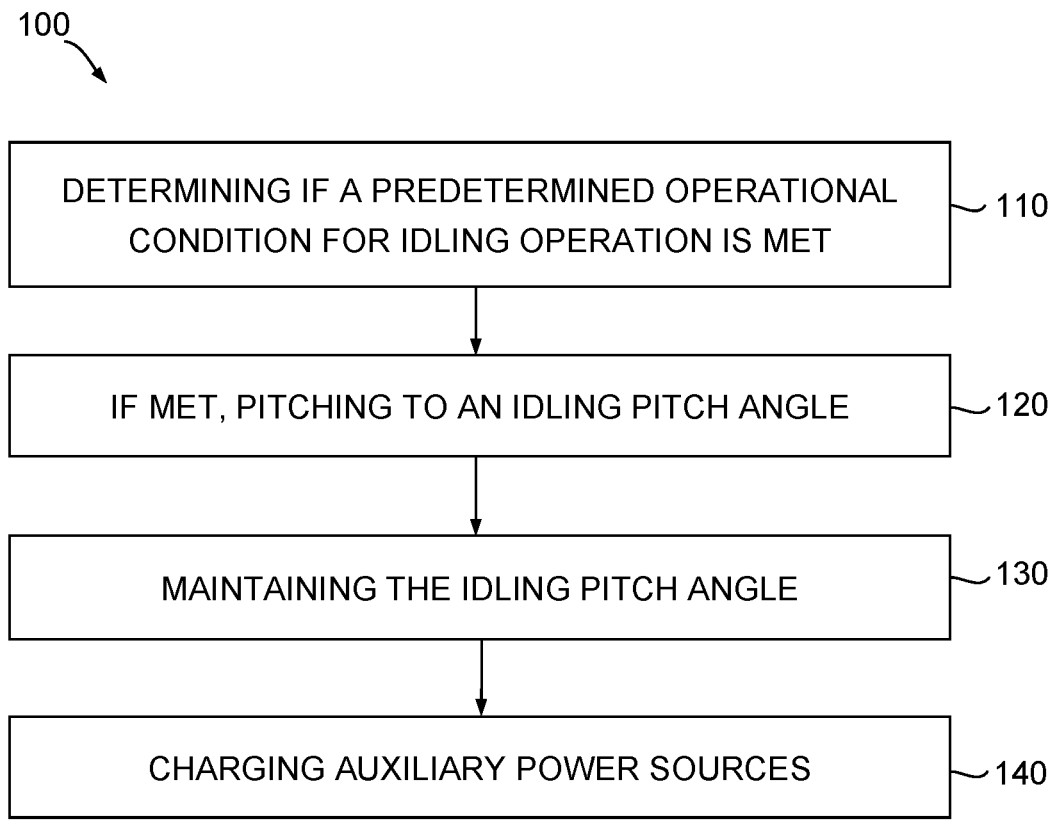
FIG. 3 shows a flow chart of an example of a method for operating a wind turbine.

In an aspect of the present disclosure, a method 100 for operating a wind turbine 10 is provided. The wind turbine 10 comprises a wind turbine rotor 18 including a plurality of blades 22 and a wind turbine generator 42 (such as illustrated in FIGS. 1 and 2 for example). The wind turbine 10 is configured to supply electrical power from the generator 42 to one or more auxiliary power sources 84 at least in an autonomous mode. The method 100 is schematically shown in the flow chart of FIG. 3.

The wind turbine is configured to supply power from the generator 42 to an auxiliary power source at least in an autonomous mode. This means that in some examples, the wind turbine is further configured to supply power to auxiliary power sources also during normal operation.

The method comprises, at block 110, determining whether a predetermined condition for idling operation of the wind turbine 10 is met. The method further comprises, at block 120, if the predetermined condition for idling operation is met, pitching the blades 22 to an idling pitch angle 25 such that the wind turbine generator 42 produces power for charging the auxiliary power sources above a predetermined wind speed. The method further comprises, at block 130, keeping the pitch angle 25 of the blades 22 at the idling pitch angle 25, and, at block 140, charging the auxiliary power sources 84 when a prevailing wind speed reaches or exceeds the predetermined wind speed.

Therefore, when for example a certain condition which may endanger the wind turbine 10 in whole or in part is detected, the wind turbine blades 22 are pitched to a predetermined idling pitch angle 25 in which the generator 42 is able to produce power for charging one or more auxiliary power sources 84. For example, one or more energy storage sources 84 may be provided within the nacelle 16 and may be electrically connected to the generator 42. The predetermined idling pitch angle 25 may be selected such that the auxiliary power sources 84 are charged once the wind speed reaches a certain value (and not charged below what value of wind speed). The idling pitch angle 25 of the blades 22 is kept substantially constant. In this way, if the wind speed is below a certain wind speed, the wind turbine generator 42 will not be able to supply power for charging the auxiliary power sources. I.e. at lower wind speeds, no electrical power is generated by the generator, or the electrical power that is generated is not suitable for supplying to an auxiliary power source. It has been found that a certain minimum rotational speed for the rotor is necessary to generate electrical power with a suitable waveform, which can be provided to an auxiliary power source (e.g. through a suitable power converter). But if the wind speed reaches, e.g. overcomes a certain wind speed, the generator 42 will be able to generate power and the auxiliary power sources 84 will start to be charged.

In this way, the number and/or size of energy storage sources, e.g. batteries, ultracapacitors, UPS or diesel generators may be reduced in comparison with a wind turbine 10 which is not able to perform method 100.

One or more auxiliary power sources 84 may be arranged in any suitable location with respect to the wind turbine 10. In some examples, one or more energy storage devices 84 may be placed within a nacelle 16. In FIG. 2, an auxiliary power source 84 is shown for the pitch system 32 of a blade 22. It should be understood that such energy storage source may be placed in other locations in other examples, e.g. in the tower, at or near the base of the tower, in a transition piece and other. It should also be understood that further energy storage devices 84 may also be provided in the example of FIG. 2 or in other examples. An auxiliary power source may also be arranged within a wind farm such that it may supply electric power to more than one wind turbine 10.

It may be understood that "predetermined" refers to the fact that a condition for idling operation, an idling pitch angle 25 and threshold wind speed which allows for auxiliary power supply charging are determined or known in advance, e.g. before a condition for idling operation has been detected and/or before and idling pitch angle has to be adopted. Also, it may be understood that "predetermined" implies that an idling pitch angle and a threshold wind speed are not determined, adapted, adjusted or identified in a continuous manner.

In some examples, an idling pitch angle 25 may be selected such that the charging begins once a specific wind speed is reached. The pitch angle 25 may also be selected such that the wind turbine 10 is not damaged at high wind speeds. High wind speeds may herein be understood as wind speeds above a cut-out wind speed, e.g. above 25 m/s, and particularly may be significantly higher than the cut-out wind speed. As the blades 22 are maintained at the predetermined pitch angle 25 regardless of a prevailing wind speed, the pitch angle 25 should be selected such that at high wind speeds, e.g. at 30 m/s, 40 m/s or more, damage to the wind turbine 10 is not inflicted. In this regard, in method 100 the idling pitch angle 25, once adopted, is not controlled, either actively or passively, and is fixed.

A condition for idling operation may generally be determined, identified or known before installing a wind turbine. In some examples, a predetermined wind speed and an idling pitch angle may be determined before installing a wind turbine, or during installation or commissioning of the wind turbine. In other examples, a predetermined wind speed and an idling pitch angle may be determined during normal operation or during autonomous operation of the wind turbine. For instance, if during normal or autonomous operation a condition for idling operation is detected, or it is known or suspected that a condition for idling operation will be met in some time, e.g. hours or days, weather forecasts may be used to determine a predetermined wind speed and an idling pitch angle. Such a predetermined wind speed may in some examples be received from a remote operating center.

In some examples, a statistical distribution of wind speed at a wind turbine site over a certain period of time may be known. For example, the evolution of wind speed at a wind turbine site during several weeks or months may be known. In view of the wind speed distribution, a suitable threshold wind speed at or above which the wind turbine is to start supplying power to one or more auxiliary power sources 84 during idling may be selected. For instance, the most probable wind speed over a certain period of time. In other examples, a minimum wind speed for charging one or more auxiliary power sources 84 at least a certain number of times within a certain period of time, e.g. once per week, may be determined from the wind distribution. Then, a rotor speed necessary for the generator 42 to start producing power when reaching the selected wind speed may be calculated. Finally, a pitch angle of the blades 22 for achieving the calculated rotor speed may be determined. If it is believed that a predetermined idling pitch angle may cause wind turbine damage at high wind speeds, e.g. after performing computer simulations with an initially chosen idling pitch angle, another idling pitch angle may be selected instead.

In another example, security considerations, e.g. avoiding or reducing excessive wind turbine loads at high wind speeds may be prioritized when choosing a wind speed threshold and a corresponding idling pitch angle. Based on the statistical distribution of winds, a probability may be calculated that during a disconnection from the grid of e.g. two weeks, very high wind speeds may occur. Based on such a probability calculation, a pitch angle may be determined that ensures, that even if such high wind speeds occur, the loads and the idling wind speed will still be acceptable. This approach may lead to a higher pitch angle, and thus less frequent charging of the auxiliary power sources during idling.

Similar considerations may apply if weather forecasts are used to determine a predetermined wind speed and a predetermined idling pitch angle.

Figures 4A, 4B, 4C:
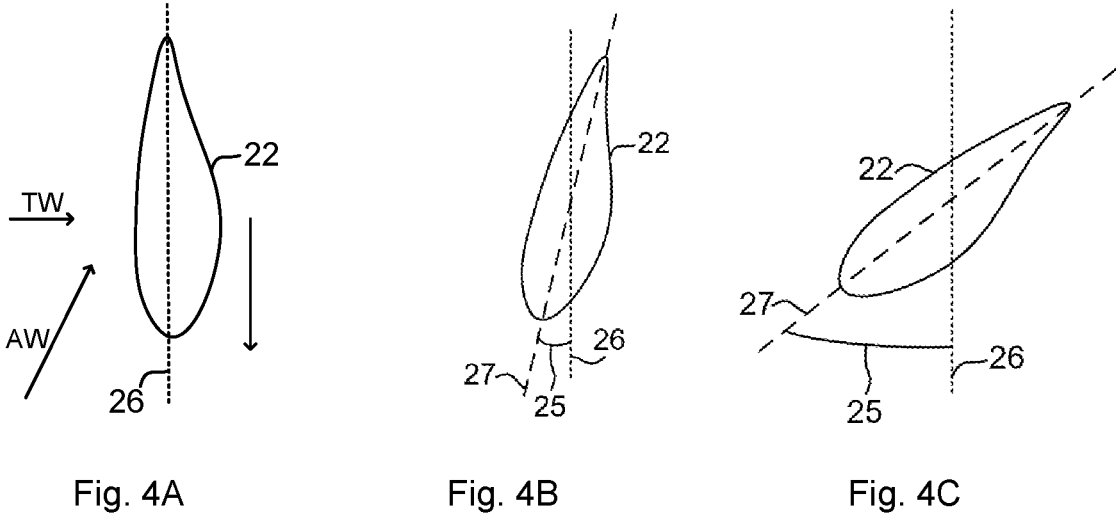
FIGS. 4A, 4B and 4C schematically illustrate different pitch angles of a wind turbine blade according to an example.

Throughout this disclosure, a pitch angle of a wind turbine blade 22 may be understood as an angle 25 that may be measured, in cross-section, between a reference line 26 and a chord of the blade 27, see FIGS. 4A, 4B and 4C. The reference line 26, indicated as a dotted line in FIGS. 4A, 4B and 4C, may be substantially parallel to a rotor plane of a wind turbine 10. FIGS. 4A, 4B and 4C schematically illustrate a blade 22 in cross-section. The wind, see arrow "TW", may blow from left to right in these figures. The wind turbine blade 22 rotates in the rotor 18 plane and moves, in this figure, in a downwards direction, resulting in an apparent wind flow, see arrow "AW" upwards. The apparent wind AW is composed of the wind caused by the rotation of the blade and the wind blowing against the blades 22 in an axial direction TW.

The right hand side of the profiles shown in FIGS. 4A, 4B and 4C may be understood to be the suction side of the blade, whereas the left hand side may be understood to be the pressure side of the blade.

In FIG. 4A, the blade is in a reference position for the pitch angle 25. In the reference position, a chord 27 of the blade is substantially parallel to the reference line 26. In FIG. 4A, a chord 27 of the blade and the reference line 26 overlap. The pitch angle 25 may therefore be 0° or a "default pitch angle". The default pitch angle, or "reference position" may be a position that the wind turbine blade 22 will maintain over a range of low wind speeds, e.g. of sub-nominal wind speeds.

In FIG. 4B, the blade has been pitched away from the reference position. A pitch angle 25 in FIG. 4B is therefore higher in FIG. 4B than in FIG. 4A. In FIG. 4C, the pitch angle 25 has been further increased with respect to the reference position. Increasing the pitch angle 25 may generally slow down the wind turbine rotor i.e. the wind turbine blade is set in a position in which it is configured to generate less lift and more drag to reduce the aerodynamic torque of the wind turbine rotor. Pitching the blades 22 to about 90° from the reference position may put the wind turbine in a feathered position and possibly completely stop it or at least greatly reduce its rotational speed. The feathered position of the blades is the position in which the blades may be placed when the wind turbine is parked e.g. for maintenance.

In some examples, the idling pitch angle may be between 55° and 80°, and specifically between 60° and 75°. Pitch angles 25 in this interval may allow for charging the auxiliary power sources already at frequently occurring wind speeds, therefore maximizing time periods in which charging occurs, as well as avoiding wind turbine damage at high wind speeds, e.g. above a cut-out wind speed. In other examples, other pitch angles 25 may be deemed suitable and may therefore set as idling pitch angles.

In some examples, the idling pitch angle may be such that the rotor 18 rotates at least at 1.5 RPM, specifically at least at 1.8 RPM, and more specifically at least at 2 RPM, when the blades 22 are at the idling pitch angle and a prevailing wind speed is the predetermined wind speed. A minimum speed of rotation of the rotor 18 may be necessary for the generator 43 to start to produce power and charge the energy storage devices. Such a minimum speed of rotation may be about 2 RPM, and the predetermined pitch angle may be set such that the minimum speed of rotation is attained at a specific (predetermined) wind speed.

In some examples, the idling pitch angle may be such that the predetermined wind speed is at least 8 m/s, specifically at least 10 m/s, and more specifically at least 12 m/s. In some of these examples, the predetermined wind speed may be between 8, 10 or 12 m/s and 20 m/s. Setting a pitch angle that allows to begin charging at a wind speed of at least 8 m/s, e.g. at a wind speed between 8 m/s and 20 m/s, may provide a good balance between time periods in which charging is possible and avoiding damage to the wind turbine at high wind speeds.

In some examples, determining whether a predetermined condition for idling operation is met may comprise determining whether a dangerous condition is present. If a dangerous operational condition is determined and the wind turbine does not act, it may be damaged. For avoiding damage, the wind turbine blades are pitched to the idling pitch angle.

One or more danger indicators may be detected. In some examples, it may be determined whether a prevailing wind speed is at or above a cut-out wind speed. The prevailing wind speed may for example be determined by a meteorological measurement system 58, e.g. a wind anemometer. In some examples, it may be determined whether a speed of the rotor 18 is at or above a rotor speed maximum threshold. A current value of rotor speed may for instance be determined by a shaft sensor 51 or a generator sensor 51. In some examples, it may be determined whether a wind turbine loading is at or above a loading threshold. Loading may include at least one of forces, stresses, and vibrations. A shaft sensor 51 may be used for determining wind turbine loads. In general, different types of sensors arranged at different wind turbine locations known in the art may be used. If one or more of these dangerous conditions are met, the blades 22 will be pitched to the idling pitch angle. Pitching may help to avoid wind turbine damage while obtaining opportunities for charging the energy storage systems of the wind turbine and/or the wind farm.

In some examples, determining whether a predetermined condition for idling operation is met may comprise determining whether a condition to reduce or to stop supplying power to the electrical grid is met. This may be the case for example if the electrical grid is unbalanced and the grid is receiving too much power, or if there is a high risk that the wind turbine will be damaged, e.g. if the wind turbine rotor 18 rotates too fast. If this determination is positive, besides pitching the blades 22 to the idling pitch angle, the method may further comprise reducing or stopping the supply of power to the electrical grid.

In addition, the method may further comprise stopping obtaining power form the electrical grid in some examples. The wind turbine would accordingly be unable to supply power to the grid as well as to receive power from the grid. Throughout this disclosure, when a wind turbine 10 does not supply, and also does not obtain, electric power to/from the grid, it may be said that the wind turbine is (electrically) disconnected from the grid. Pitching 120 the blades to the idling pitch angle may be performed first and then the wind turbine may be disconnected from the grid.

In some examples, determining whether a predetermined condition for idling operation is met may comprise determining whether the wind turbine 10 is unable to withdraw power from the electrical grid. In some examples, a physical connection between the wind turbine and the electrical grid may be missing, e.g. because a busbar or some cables are damaged or broken. In other examples, a physical connection between the wind turbine and the electrical grid may be present, but other reasons, e.g. electrical faults, may prevent that the wind turbine obtains power from the grid. In some examples, determining whether a predetermined operational condition is met may comprise determining whether the wind turbine has lost its connection to the electric grid, i.e. if in addition of not being able to withdraw power from the grid, the wind turbine is not able to supply power to the grid.

The determination of whether a predetermined condition for idling operation is met may be performed during normal operation of the wind turbine, i.e. while the wind turbine is supplying power to the electrical grid, in some examples.

For instance, the presence of a dangerous condition for the wind turbine and whether the wind turbine is able or not to supply and/or to withdraw power to/from the electrical grid may be checked during normal operation of the wind turbine.

If the step of determining 110 is performed while the wind turbine is in a normal mode of operation, the wind turbine 10 may start an autonomous mode of operation in some examples. In this mode, relevant electrical systems of the wind turbine may be powered by auxiliary power sources in order to keep them in operation. For example, it may be necessary to maintain the communications systems and the temperature regulation and ventilation systems in operation. As the blades are positioned at the idling pitch angle, the auxiliary power sources will be charged only when a prevailing wind speed reaches at least the predetermined wind speed. Important electrical systems may keep working during longer periods of time. Alternatively or additionally, a number and/or size of the energy storage systems may be reduced.

In some examples, instead of being in "normal operation", the wind turbine may already be in an autonomous mode of operation when the step of determining 110 is performed. In these examples, determining whether a predetermined condition for idling operation is met may comprise determining whether an energy level of one or more of the auxiliary power sources is below an energy threshold. If this condition is met, the wind turbine blades 22 may be pitched to the predetermined pitch angle for charging the energy storage devices. A larger or a smaller energy threshold may be selected for example depending on the location of the wind turbine, expected wind speeds, expected time without grid connection and more. Once at the idling pitch angle, the pitch angle is maintained substantially constant. In other words, no active or passive pitch control takes place. Other suitable conditions may be checked in other examples In some examples, the idling pitch angle may be maintained at least until a condition for stopping idling operation is detected. For example, once the prevailing wind speed no longer poses a risk for the wind turbine, the wind turbine blades 22 may be pitched away from the idling pitch angle. In some examples, the idling pitch angle may be kept at least until the wind turbine 10 is able to extract power from the electrical grid, e.g. at least until the wind turbine recovers connection with the grid. For instance, if the wind turbine is operating in an autonomous mode, the wind turbine may be able to regain connection to the grid whenever the grid fault has been resolved or grid situation has changed. Afterwards, it may be decided whether to maintain or to change the pitch angles of the blades. If the wind is operating in an autonomous mode and the auxiliary power sources end up being depleted, the autonomous mode may be restarted once the auxiliary power sources have enough energy again. I.e., the method may further comprise restarting the autonomous mode after the depletion of the auxiliary power sources and the subsequent charging at or above the predetermined wind speed. The idling pitch angle may be maintained for as long as needed. It may happen that the autonomous mode is re-started more than once before the wind turbine is able to at least withdraw energy from the electrical grid.

In some examples, the idling pitch angle may be maintained at least until a stored energy threshold of one or more power sources 84 has been achieved. For instance, the idling pitch angle may be maintained until some, or even all, the power sources have reached an energy storage level of 80%, 90%, 95% or more. In some of these examples, once the threshold for the stored energy has been attained, e.g. once the power sources are substantially completely recharged, the blades 22 may be pitched to a feathered position, e.g. to about 90°.

In some examples, the idling pitch angle may be maintained until a predetermined period of time expires. For instance, the pitch angle of the blades may be maintained at the idling pitch angle during a first predetermined period of time and the blades may be changed to, and maintained at, a feathered position during a second predetermined period of time. The first period of time and the second of period of time are included during idling operation. The second period of time may start immediately after the first period of time expires. The first period of time and the second period of time may alternate. For example, the blades may be maintained at the predetermined idling pitch angle during a first period of time, then the blades may be feathered and maintained feathered during a second period of time, then the blades may be again positioned at the idling pitch angle during the first period of time and so on.

In some examples, the method may further comprise triggering an alarm if a dangerous condition is detected while the blades are arranged at the idling pitch angle. An alarm may be conveyed in any suitable form. For example, an alarm may comprise an output message and the output message may be transmitted to a wind turbine operator or to a remote operating center. An output message may indicate what the danger condition is, e.g. excessive wind speeds or loads. In response to an alarm, the pitch angle 25 of the blades 22 may be (slightly) modified for reducing the risk of damage to the wind turbine in some examples. This should not be understood as an active pitch control, but as a minor adaptation of a fixed pitch control in case very strong winds, loads or other endanger the wind turbine.

Figure 5:
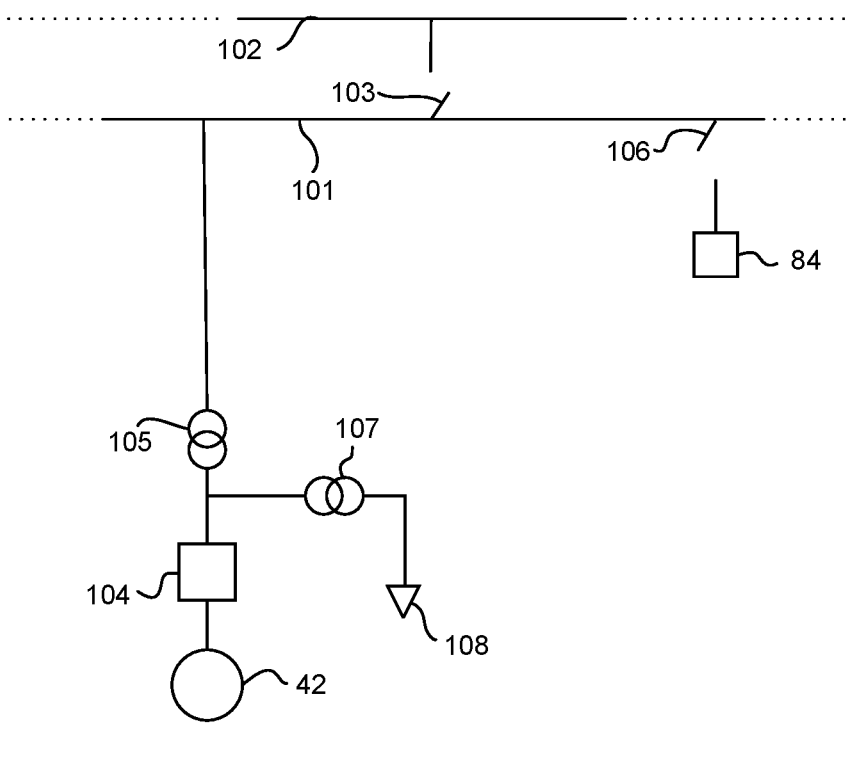
FIG. 5 schematically illustrates an example of a wind turbine connected to an electrical grid and to one or more auxiliary power sources.

FIG. 5 schematically illustrates an example of a wind turbine 10 of a wind farm, e.g. an offshore wind turbine, connected to a wind farm busbar 101, and then connected to the electrical grid 102 by a first switch 103. All the wind turbines of the wind park (not shown) are connected to the busbar 101 of the wind farm. The connection between the electrical grid 102 and the wind farm busbar 101 is regulated by the first switch 103.

The generator 42 of the wind turbine produces AC (alternating current) power of variable frequency due to varying wind conditions. A power converter 104 may be provided for adjusting the power output from the generator 42 to one suitable for the grid 102, e.g. to an AC power having fixed frequency. The power converter 104 may comprise a machine-side converter, a line-side converter and a DC (direct current) link connecting the machine-side and the line-side converter (not shown).

The generator 42 of the wind turbine may be a permanent magnet generator comprising a generator rotor carrying a plurality of permanent magnets and a stator in some examples. The permanent magnet generator may be directly driven by the wind turbine rotor 18. The stator of the generator may be connected to the machine-side converter, which may be configured to convert the received AC voltage to DC voltage, the DC voltage then being delivered to the DC-link. The line-side converter may be configured to convert the DC voltage from the DC-link into a fixed frequency AC voltage.

The line-side converter may be connected to the wind farm busbar 101 through a main transformer 105. The main transformer 105 may be configured to step-up the voltage delivered by the power converter 104, e.g. to 3.3 kV. The main transformer 105 may be installed within the nacelle 16 or the tower 15 of the wind turbine in some examples. The main transformer 105 may be arranged at other suitable places in other examples.

The wind turbine may also include an auxiliary transformer 107 configured to provide a source of low-voltage power, e.g. about 400 V, to some electric elements of the wind turbine. The auxiliary transformer 107 may for example supply power to the critical electrical components 108 of the wind turbine such as ventilation and temperature regulation systems. The auxiliary transformer 107 may be housed within the nacelle 16 of the wind turbine and may be connected to the main transformer 105.

Wind farms may comprise a substation including e.g. wind farm transformers that convert power from a wind farm voltage to a grid voltage. In some examples, an auxiliary transformer 107 may also be arranged at a substation. The auxiliary transformer 107 may accordingly supply auxiliary power to a plurality of wind turbines. The auxiliary transformer 107 may in general be placed at any suitable location within a wind farm.

One or more auxiliary power sources 84 may be connected to the wind farm busbar 101 through a second switch 106, as in the example of FIG. 5. One or more auxiliary power sources 84 may be provided at a wind farm substation in some examples. Therefore, auxiliary power may be supplied to a plurality of wind turbines simultaneously. In other examples, one or more auxiliary power sources 84 may be installed near or within individual wind turbines for supplying power to each wind turbine individually. One or more auxiliary power sources for supplying auxiliary power to a single wind turbine as well as one or more auxiliary power sources for supplying auxiliary power to two or more wind turbines may also be provided. In general, any suitable number and location of auxiliary power sources 84 may be chosen.

In the example of FIG. 5, the main transformer 105 is configured to receive electrical power from the electrical grid 102 at a first voltage and electrical power from one or more auxiliary power sources 84 at a second voltage different from the first voltage, e.g. lower than the first voltage. The electrical grid 102 is configured to provide electrical power to the wind farm busbar 101 in normal operation, and the auxiliary power source(s) 84 are configured to provide electrical power to the busbar 101 e.g. in case of grid loss. The wind turbine is configured to provide electrical power to the grid 102 at the first voltage, and optionally to the auxiliary power sources 84 at the second voltage, during normal operation of the wind turbine. The wind turbine is configured to provide electrical power to the auxiliary power sources 84 at the second voltage in an autonomous mode of operation of the wind turbine.

If the wind turbine can no longer receive power from the electrical grid 102, the wind turbine may start to withdraw it from the one or more auxiliary power sources 84. Critical electrical components 108 of a wind turbine 10 may therefore be powered through the auxiliary transformer 107 of the wind turbine. The auxiliary wind turbine transformer 107 may transform the power received from the main transformer 105 of the wind turbine to a voltage level required by the electrical components of the wind turbine it feeds, e.g. from 3.3 kV to 0.4 kV. The batteries of the power sources 84 may therefore be charged when the wind turbine rotor 18 is rotating at or above a predetermined wind speed and the blades 22 are at the idling pitch angle.

The above explanation may be adapted to the number and position of main transformers 105, auxiliary transformers

107, auxiliary power sources 84, voltage levels and the number of wind turbines 10 from/to which they withdraw/send electric power.

In some examples, an uninterruptible power supply (not shown) may be arranged with some critical electrical components 108. In case of grid loss, it may take some time to have electrical power delivered from some auxiliary power source(s) 84 to the critical electric components. For example, a diesel generator needs to be started up and warmed up before being able to deliver full power. The uninterruptible power supply (not shown) may be able to deliver electrical power for e.g. up to approximately 30 minutes or more. By then, the electrical power supply from the available auxiliary power sources 84 should be established.

Figure 6:
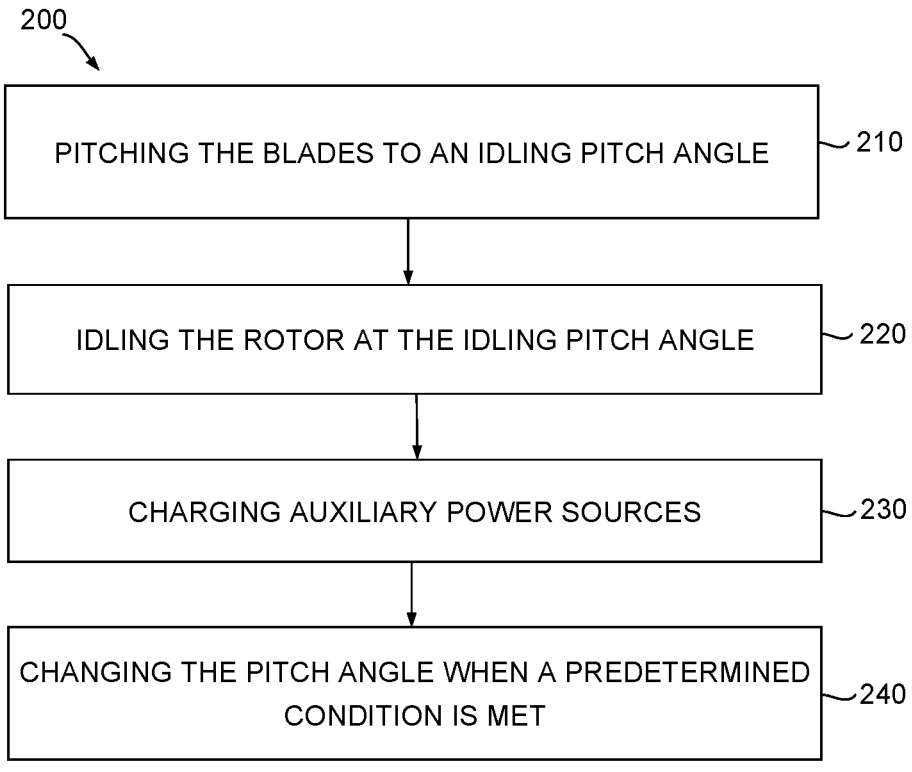
FIG. 6 shows a flow chart of another example of a method for operating a wind turbine.

In a further aspect of the disclosure, a method 200 for operating a wind turbine 10 is provided. The wind turbine 10 comprises a rotor 18 including a plurality of blades 22 and a generator 42. The wind turbine 10 is configured to send electrical power from the generator 42 to one or more auxiliary power sources 84 at least in an autonomous mode of operation of the wind turbine. Method 200 is shown in the flow chart of FIG. 6. Aspects and explanations with respect to method 100 may be combined and applied to method 200 and vice versa.

The method comprises, at block 210 and when the wind turbine 10 is in the autonomous mode of operation, pitching the blades 22 to an idling pitch angle. The method further comprises, at block 220, idling the wind turbine rotor with a fixed pitch angle corresponding to the idling pitch angle. I.e. the pitch angle 25 of the blades 22 is maintained at the idling pitch angle. The method further comprises, at block 230, charging the auxiliary power sources when a rotor rotational speed in idling is at or above a rotational speed threshold, i.e. when the prevailing wind speed is sufficiently high so that the rotor idles at a sufficiently high speed for electrical power to be generated in the generator, (converted in the power converter), and supplied to auxiliary power sources and/or auxiliary components.

The method further comprises, at block 240, changing the pitch angle of the blades when a predetermined (operational) condition is met.

In some examples, a predetermined condition for idling operation may be detected before the step of pitching 210 is performed. For example, it may be determined whether an energy level of one or more of the auxiliary power sources 84 is below an energy threshold. In other examples, pitching 210 may be performed once the capability of withdrawing power from the grid is lost and detected. In yet further examples, pitching 210 may be performed a certain period of time, e.g. a predetermined amount of time such as a few minutes, after detection of the incapability of obtaining power from the grid.

In some examples, the wind turbine 10 may be idling with the blades at a feathered position, e.g. at a pitch angle of about 90°, before the blades 22 are pitched to a predetermined pitch angle which allows charging auxiliary power sources, e.g. of about 70°.

A predetermined operational condition may include one or more of recovering the ability to withdraw power from the electrical grid, e.g. regaining connection to the electrical grid, and the triggering of an alarm, e.g. due to high wind speeds. In some examples, the predetermined pitch angle is such that the wind speed is at least 8 m/s, specifically at least 10 m/s, and more specifically at least 12 m/s.

In some examples, the predetermined pitch angle is between 55° and 80°.

In a further aspect of the disclosure, a wind turbine 10 configured to perform any of the methods 100, 200 disclosed herein. The wind turbine 10 comprises a rotor 18 including a plurality of blades 22, a generator 42, and optionally one or more auxiliary power sources 84. The wind turbine is configured to supply electrical power from the generator 42 to one or more auxiliary power sources 84 at least in an autonomous mode of operation of the wind turbine. In this way, the auxiliary power sources may be charged when a certain condition for idling is detected and the blades 22 are positioned and kept at the predetermined pitch position. The wind turbine 10 may be an onshore wind turbine or an offshore wind turbine.

The wind turbine 10 may comprise a control system configured to carry out any of the methods hereinbefore described.

This written description uses examples to disclose a teaching, including the preferred embodiments, and also to enable any person skilled in the art to put the teaching into practice, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, can be mixed and matched by one of ordinary skill in the art to construct additional embodiments and techniques in accordance with principles of this application. If reference signs related to drawings are placed in parentheses in a claim, they are solely for attempting to increase the intelligibility of the claim, and shall not be construed as limiting the scope of the claim.

The invention claimed is:

1. A method for operating a wind turbine that includes a rotor with a plurality of blades and a generator, wherein the wind turbine is configured to supply electrical power from the generator to one or more auxiliary power sources in an autonomous mode of operation, the method comprising:

determining whether a predetermined condition for idling operation of the wind turbine is met;

when the predetermined condition for idling operation is met, pitching the blades to a predetermined idling pitch angle at which the generator can produce power for charging the auxiliary power sources during idling within a predetermined wind speed range;

maintaining the pitch angle of the blades at the predetermined idling pitch angle during idling;

charging the auxiliary power sources when a prevailing wind speed is within the predetermined wind speed range;

wherein the predetermined idling pitch angle is between 60° and 75° such that the rotor rotates at least at 2 RPM during idling when the blades are at the idling pitch angle;

the idling pitch angle predetermined for wind speeds within the predetermined range of 8 m/s to 20 m/s; and wherein charging of the auxiliary power sources during the idling operation is alternated between charging and non-charging by: maintaining the blades at the predetermined idling pitch angle for a first predetermined period of time, thereafter positioning the blades to a feathered pitch angle for a second predetermined period of time, and thereafter positioning the blades back to the predetermined idling pitch angle.

2. The method of claim 1, wherein determining whether a condition for idling operation is met comprises determining whether a dangerous condition is present.

3. The method of claim 1, wherein determining whether a condition for idling operation is met comprises determining whether a condition to reduce or to stop supplying power to an electrical grid is met.

4. The method of claim 3, further comprising reducing or stopping the supply of power to the electrical grid.

5. The method of claim 1, wherein determining whether a condition for idling operation is met comprises determining whether the wind turbine is unable to withdraw power from an electrical grid.

6. The method of claim 1, wherein determining whether a condition for idling operation is met is performed during normal operation of the wind turbine.

7. The method of claim 6, further comprising starting the autonomous mode of operation.

8. The method of claim 1, wherein determining whether a condition for idling operation is met is performed when the wind turbine is in the autonomous mode of operation.

9. The method of claim 8, further comprising restarting the autonomous mode after depletion of the auxiliary power sources and their subsequent charging at or above the predetermined wind speed.

10. The method of claim 1, wherein the idling pitch angle is maintained at least until a condition for stopping idling operation is detected.

11. The method of claim 10, wherein the idling pitch angle is maintained at least until the wind turbine recovers connection with a grid.

12. A wind turbine, comprising:

a rotor including a plurality of blades;

a generator;

a control system;

wherein the wind turbine is configured to supply electrical power from the generator to one or more auxiliary power sources in an autonomous mode of operation;

the control system configured to perform the method according to claim 1.

13. A method for operating a wind turbine that includes a rotor with a plurality of blades and a generator, wherein the wind turbine is configured to supply electrical power from the generator to one or more auxiliary power sources in an autonomous mode of operation, the method comprising:

when the wind turbine is in the autonomous mode of operation, pitching the blades to a predetermined idling pitch angle;

idling the wind turbine rotor at the predetermined idling pitch angle;

charging the auxiliary power sources when a rotor rotational speed in idling is at or above a rotational speed threshold;

wherein the predetermined idling pitch angle is between 60° and 75° such that the rotor rotational speed in idling is at least 2 RPM during idling;

the predetermined idling pitch angle is determined for wind speeds within a range of 8 m/s to 20 ms;

changing the pitch angle of the blades when a predetermined operational condition is met; and wherein charging of the auxiliary power sources during the idling operation is alternated between charging and non-charging by: maintaining the blades at the predetermined idling pitch angle for a first predetermined period of time, thereafter positioning the blades to a feathered pitch angle for a second predetermined period of time, and thereafter positioning the blades back to the predetermined idling pitch angle.

14. The method of claim 13, wherein the predetermined operational condition includes recovering the ability to withdraw power from the electrical grid.

15. The method of claim 13, wherein the predetermined operational condition includes triggering of an alarm due to high wind speeds.

* * * * *